US006816863B2

United States Patent
Bates et al.

(10) Patent No.: US 6,816,863 B2
(45) Date of Patent: Nov. 9, 2004

(54) METHOD, SYSTEM, AND COMPUTER PRODUCT FOR PROVIDING A DISTRIBUTION LIST

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 10/142,527

(22) Filed: May 9, 2002

(65) Prior Publication Data

US 2003/0212680 A1 Nov. 13, 2003

(51) Int. Cl.[7] .............................................. G06F 7/30
(52) U.S. Cl. .................................................... 707/10
(58) Field of Search ........................ 707/1–10; 709/201

(56) References Cited

U.S. PATENT DOCUMENTS

| 6,216,122 | B1 | * | 4/2001 | Elson ............................. 707/3 |
| 6,366,915 | B1 | * | 4/2002 | Rubert et al. .................. 707/10 |
| 6,529,908 | B1 | * | 3/2003 | Piett et al. ..................... 707/10 |
| 6,549,950 | B2 | * | 4/2003 | Lytle et al. .................. 709/246 |
| 6,571,234 | B1 | * | 5/2003 | Knight et al. ................... 707/3 |

OTHER PUBLICATIONS

Claypool et al. "infering User Interest" Nov. 2001, IEEE Internet Computing, vol. 5, No. 6, PP 32–39.*

* cited by examiner

Primary Examiner—Jack M. Choules
(74) Attorney, Agent, or Firm—Leslie J. Payne

(57) ABSTRACT

A method, system and computer product are disclosed whereby distribution lists of invitees in an ordered manner are automatically generated for use in scheduling meetings in a way that is responsive to specifiable parameters following a review of a collection of electronic mail messages as to subject matter and recipients.

28 Claims, 12 Drawing Sheets

METHOD, SYSTEM, AND COMPUTER PRODUCT FOR PROVIDING A DISTRIBUTION LIST

BACKGROUND OF THE INVENTION

The present invention relates generally to a computer-implemented method, system, and computer product and, more particularly, to a computer-implemented method, system, and computer product for automatically generating distribution lists of invitees in an ordered manner for use in scheduling meetings in a way that is responsive to specifiable parameters.

Electronic mail (e-mail) messaging continues to be a major driving force behind the dynamic growth of electronic communications. An e-mail system includes the transfer of information by means of a networked communication. In such a system, a user at a computer connected to a network can simultaneously post electronic messages to anyone connected to the network at their unique e-mail address. Communication by means of e-mail messaging is often preferred to telephonic communications. In addition, multiple parties at diverse locations can be reached simultaneously at any given time. Clearly, these advantages have provided an extremely widespread and long-lasting impact.

Since the inception of e-mail numerous approaches for improving its ease of use and increasing its productivity have been developed. Groupware applications have, for example, been developed to enhance e-mail communications by successfully managing e-mail messages. These applications allow a group of users to access copies of messages, edit them and send responses to designated persons by the originator of the e-mail message.

However, scheduling meetings can be a relatively time-consuming task, especially when attempting to do so with a variety of individuals associated with a given subject matter. To accomplish such tasks, a meeting originator or user must independently and laboriously review diverse and often significant numbers of e-mail messages to generate a comprehensive distribution list related to a preselected subject matter for a scheduled meeting. Clearly, efficiency and productivity are adversely affected by the known approach.

Without the ability to provide distribution lists automatically for use in scheduling meetings in which the invitees are presented in an ordered manner and related by preselected subject matter, the true potential of scheduling is diminished. Accordingly, it would be highly desirable to automatically generate distribution lists for scheduling meetings in which meeting invitees are not only presented in an ordered manner, but are related to specified subject matter.

SUMMARY OF THE INVENTION

An aspect of the present invention is to provide a computer-implemented method, system, and product of automatically generating a distribution list for use in scheduling meetings following analyses of e-mail messages.

An aspect of the present invention is to provide a computer-implemented method, system, and product of automatically generating a distribution list for use in scheduling meetings following analyses of the subject matter of e-mail messages in which the invitees are listed in an ordered manner related by relevancy of their appearance in such messages.

An aspect of the present invention is to provide a computer-implemented method, system, and product of automatically generating the distribution list noted above in which the relevancy listing results from the application of parameters.

An aspect of the present invention is to provide a computer-implemented method, system, and product of automatically generating a distribution list for use in scheduling meetings following analyses of e-mail messages wherein certain messages are excluded in response to user-selected parameters.

An aspect of the invention is to provide a computer-implemented method and system of the last-noted type for automatically generating a distribution list for use in scheduling meetings in a computer network environment following analyses of related e-mail messages, preferably, by user selected search parameters.

An aspect of the invention is to provide an automatically generated distribution list for use in scheduling meetings, in which the list is presented to a user in response to setting up the meetings in which the number of potential invitees is limited as determined by resource limitations, such as the accommodation capacity of a conference room.

In this regard, the present invention is directed to a method of automatically generating at least a distribution list of invitees for use in a scheduling comprising the steps of: providing a collection of electronic messages wherein each one of the messages includes at least a recipient portion containing recipients and a subject portion containing subject matter; providing at least one search parameter for use in searching the subject matter of each one of the messages; matching messages by having the one search parameter match with subject matter having an attribute of the one search parameter; providing a relevancy ordering of recipients of the recipient portion associated with the matched messages; and, sorting the relevancy ordering of recipients to provide the distribution list.

The present invention is also directed to a system and computer product for achieving the foregoing process.

BRIEF DESCRIPTION OF THE DRAWINGS

For a more complete understanding of the present invention, reference is now made to the following detailed description of a preferred embodiment of the present invention illustrated in the accompanying drawings in which.

DETAILED DESCRIPTION

Reference is made to FIGS. 1–11 for illustrating a preferred data processing system 100 for use in implementing a preferred method of automatically generating a distribution list for scheduling meetings. The distribution list is prepopulated with ranked recipients associated with e-mail messages selected following a search conducted with parameters arranged to find messages and a relevancy ordering of the recipients listed from the matched messages according to the present invention.

Figure 1:
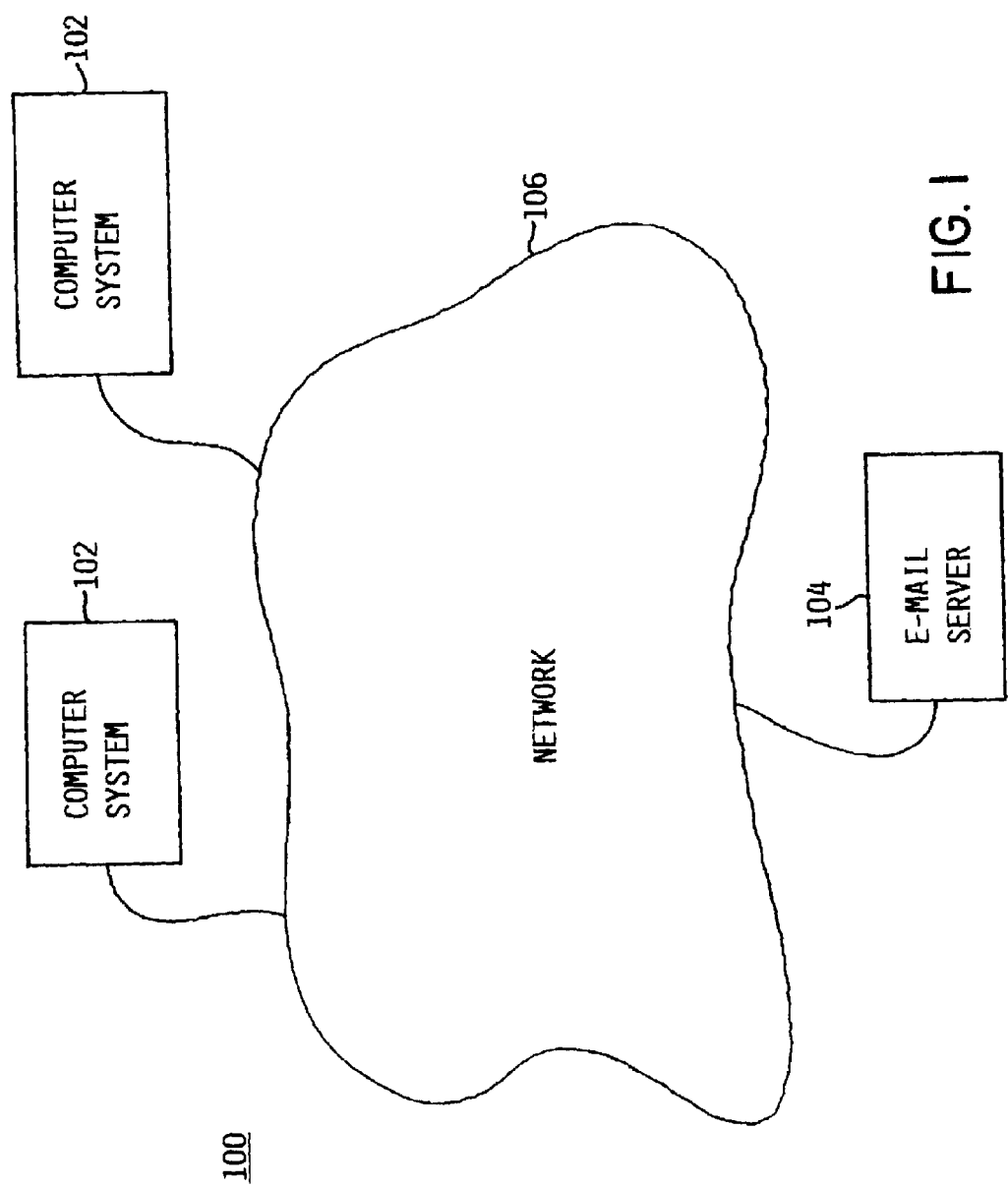
FIG. 1 is a schematic drawing illustrating a data processing system for implementing one preferred embodiment of an improved method of the present invention.

FIG. 1 depicts one preferred embodiment of the processing system 100 that comprises a plurality of computer systems 102 linked to a network e-mail server 104 through a computer network 106. All the systems on the network receive and send e-mail messages to each other. The e-mail server is also connected to the network and the Internet. The network 106 can be a local-area network or wide-area network, LAN or WAN; respectively, or for that matter the Internet. Further, the present invention contemplates wireless networks as well. The computer network can use the TCP/IP (Transmission Control Protocol/Internet Protocol) network protocol. Of course, other suitable network protocols can be used in the data processing system according to the present invention.

Figure 2:
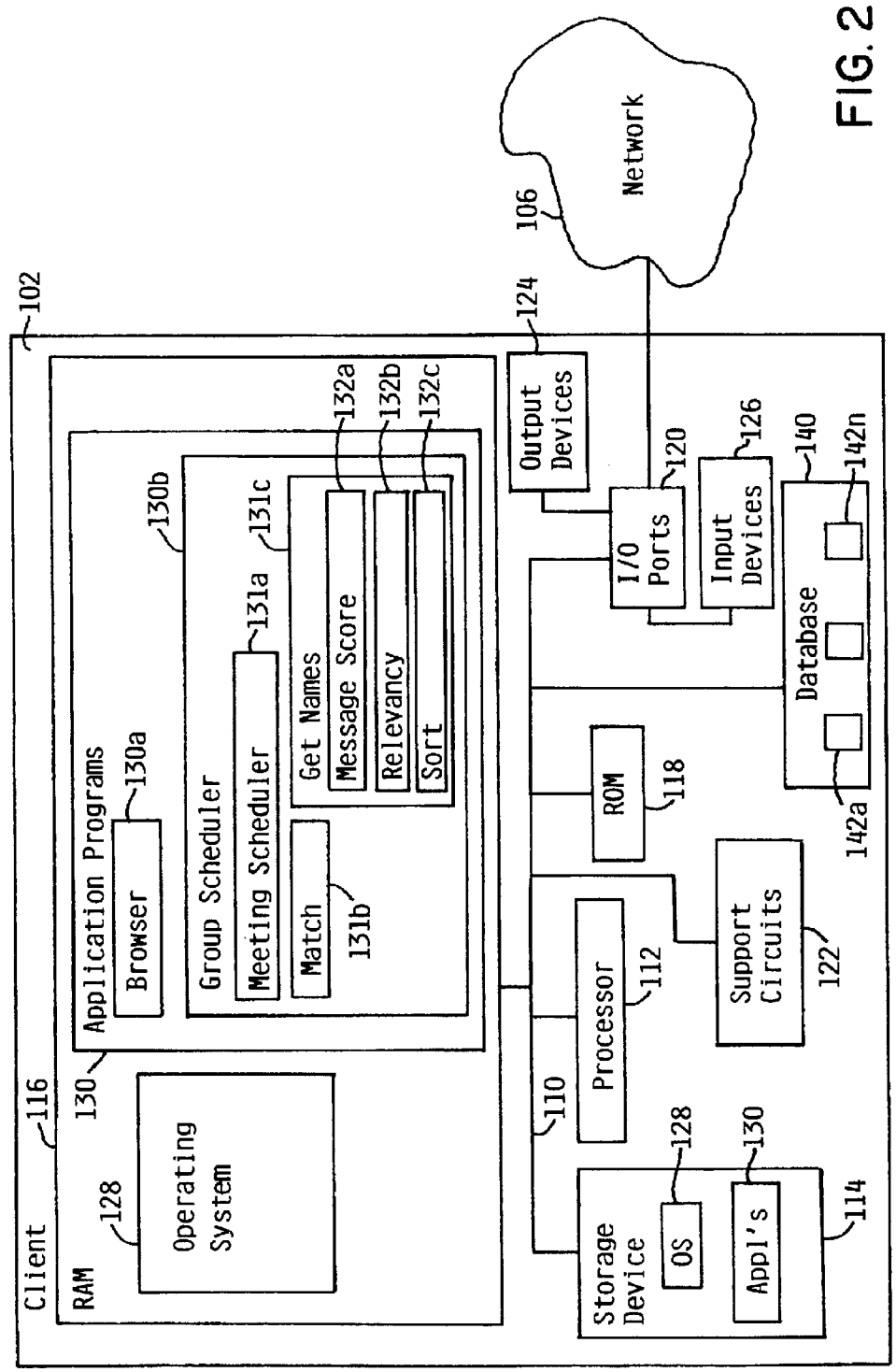
FIG. 2 is a block diagram of a computer system usable in connection with the system depicted in FIG. 1.

In FIG. 2, there is depicted a computer system 102 that can be used according to the present invention. The computer system 102 may represent any type of computer or other programmable electronic device including a client computer, a server computer, a PC-based server, a minicomputer, a midrange computer, a mainframe computer and the like. In one embodiment, the computer system 102 is an eServer iSeries 400 commercially available from International Business Machines of Armonk, N.Y. The computer systems 102 is depicted as comprising at least one system interconnect bus 110 to which various components are coupled and communicate with each other. Coupled to the system interconnect bus 110 is at least a single processor unit 112, storage device 114, memory such as random access memory (RAM) 116, read only memory (ROM) 118, input/output (I/O) ports 120, and other support circuits 122. Furthermore, one or more output devices 124 such as a display, as well as one or more user interface input devices 126, such as a keyboard and/or pointing device is respectively coupled to the I/O ports 120. In known fashion, the output and input devices 124 and 126; respectively permit user interaction with the computer system 102.

The processor unit 112 may be an IBM Power PC® processor and the like. The processor unit 112 sends and receives instructions and data formation to and from each of the computer system's components coupled to the system interconnect bus 110 and performs system operations based upon the requirements of the computer system's operating system (OS) 128 and other specialized application programs 130a–130n (collectively referred to as application programs 130).

The ROM 118 typically controls basic hardware operations. The storage device 114 can be a permanent storage medium, such as a hard disk, CD-ROM, tape, or the like, which stores the operating system 128 and the specialized applications programs 130. The RAM 116 is volatile memory (e.g., SRAM, DRAM and the like). The contents of the RAM 116 may be retrieved from the storage device 114 as required. Illustratively, the RAM 116 is shown with the operating system 128 and application programs 130 concurrently stored therein. The program code of the operating system 128 and/or application programs 130 is sent to the RAM 116 for temporary storage and subsequent execution by the processor 112. Additionally, the RAM 116 is capable of storing files from the operating system 128, as well as files from one or more application programs. The executable and library files (not shown) of the operating system 128 and application programs 130 are individually transferred from the storage device 114 to the RAM 116 for processing as needed. The transfer of the executable files may be controlled by a memory management system. The RAM 116 is capable of storing files from the operating system 128, as well as files from one or more of the application programs 130.

The I/O port 120 can include various controllers (not shown) for each input device 126, such as a keyboard, mouse, joystick, and the like, as well as the output device 124, such as an ethernet network adapter, infrared device and display (not shown). A relational type of distributed database 140 is connected to the system and is under the control of the processor. A relational database management system is a computer database management system (DBMS) controlling the storing and retrieving of data to database files 142a–142n (collectively, database files 142). The database files 142 contain detailed information on each of the saved e-mail messages, such as subject matter of the Body Portion or the Subject Portion, or recipients of the mandatory To portion or courtesy copied ("cc") portion, or blind courtesy copied ("bcc") portion.

Referring to the operating system 128, it can be a multi-tasking operating system, such as OS/400 that is commercially available from International Business Machines Corporation, Armonk, N.Y. Those skilled in the art will appreciate that the spirit and scope of the present invention are not limited to a particular operating system and can include UNIX and the like. The processor 112 controls the input device 126 which provides a user interface for allowing a user to specify search parameters relating to subject matter content of e-mail messages to be searched.

Included in the group of specialized applications 130 is a web browser application 130a, and a groupware scheduling program or application 130b that includes e-mail and group scheduling functionalities including the improved functionalities of the present invention to be described hereinafter. The web browser application 130a can support a graphical user interface ("GUI") on the display screen and have data entry fields in which a user can input parameters for configuring the group scheduling functionalities as will be described. The group scheduling program 130b of the present invention can include a known type of scheduling module 131a for scheduling meetings and controlling and managing resources linked to it, such as conference rooms and the like. Other scheduling modules supporting such functionalities are available. The group scheduling program 130b of this invention includes: a matching module 131b that is configurable for searching for matches in selected portions of the collection of electronic mail messages; a Get Names module 131c operable for getting the names of invitees for an e-mail distribution list. The Get Names module 131c includes a message score module 132a, a relevancy determination module 132b that lists groups or categories of recipients of the matched messages in an ordered manner; and a sorting module 132c that sorts the ordered list of recipients to provide the distribution list of invitees.

Figure 3:
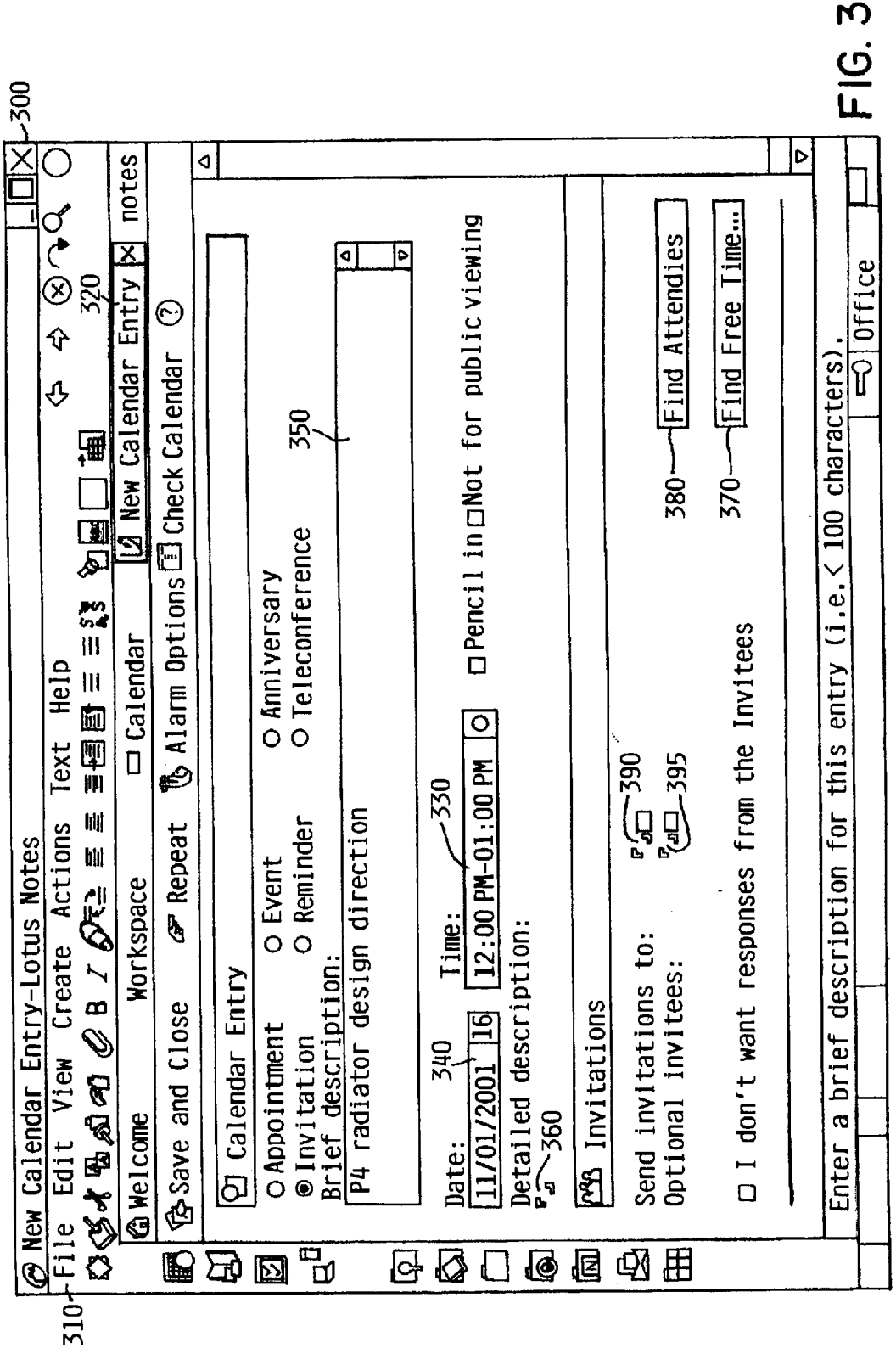
FIG. 3 is an exemplary embodiment of a graphical user interface (GUI) utilized for entering according to the present invention.

As shown in FIG. 3, the group scheduling application 130b provides a Calendar Entry GUI 300 having a menu bar 310 for invoking menu items or commands. The GUI 300 facilitates a user creating appointments and, if desired, Internet-based messaging for automatically handling invitations and replies for events. A tab 320 is provided that displays a New Calendar Entry GUI 300 for enabling access to the Calendar Entry page for commencing a meeting notice. On the GUI 300a Time field 330 is displayed, as well as a Current Date field 340. A Brief Description search field 350 is provided which allows a user to enter search query parameters for searching a collection of e-mail messages in the database files. A Detailed Description field 360 allows the user to include a more thorough description of the meetings to be scheduled. A Find Attendees button 370 when activated commences generation of the list as will be described below.

Figure 4:
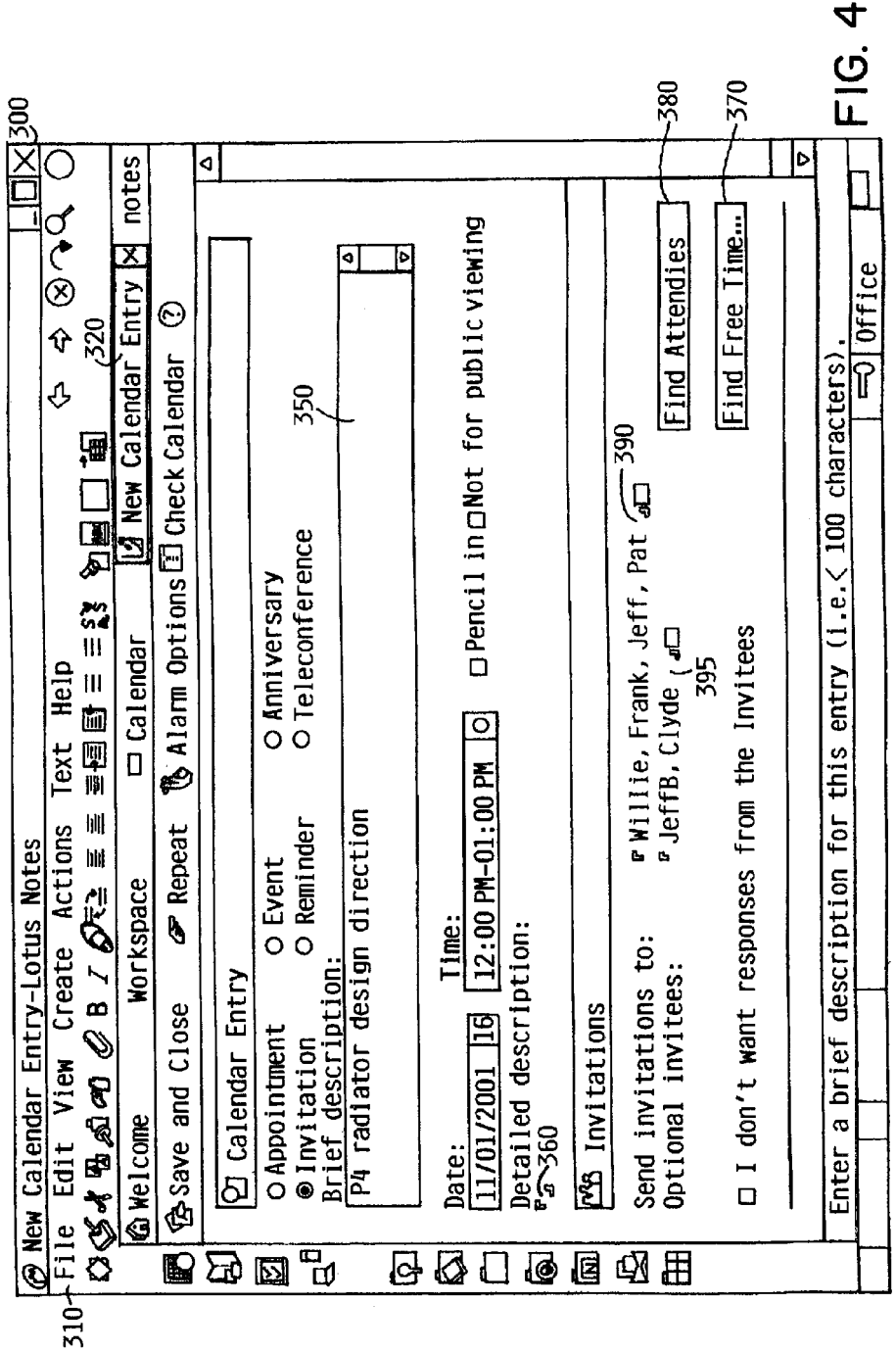
FIG. 4 is a screenshot of a graphical user interface for use in displaying a meeting with the required and optional invitees.

FIG. 4 depicts a Send Invitations To display field 390 for use in displaying the distribution list of mandatory invitees generated by a preferred embodiment of this invention. Also, an Optional Invitees display field 395 is depicted for displaying optional invitees in accordance with a preferred embodiment of the present invention.

As will be explained and made evident in greater detail hereinafter, the present invention is particularly useful from the standpoint of enabling an extremely effective and efficient manner of managing distribution of e-mail to desired invitees. This is especially the case when dealing with a relatively large volume of messages having a relatively large and diverse number of potential invitees which are otherwise not related to each other. According to the present invention, a user can initiate creation of a distribution list while otherwise composing the message for a particular e-mail message. As a consequence, great versatility and expediency are provided by use of the present invention.

Figure 5:
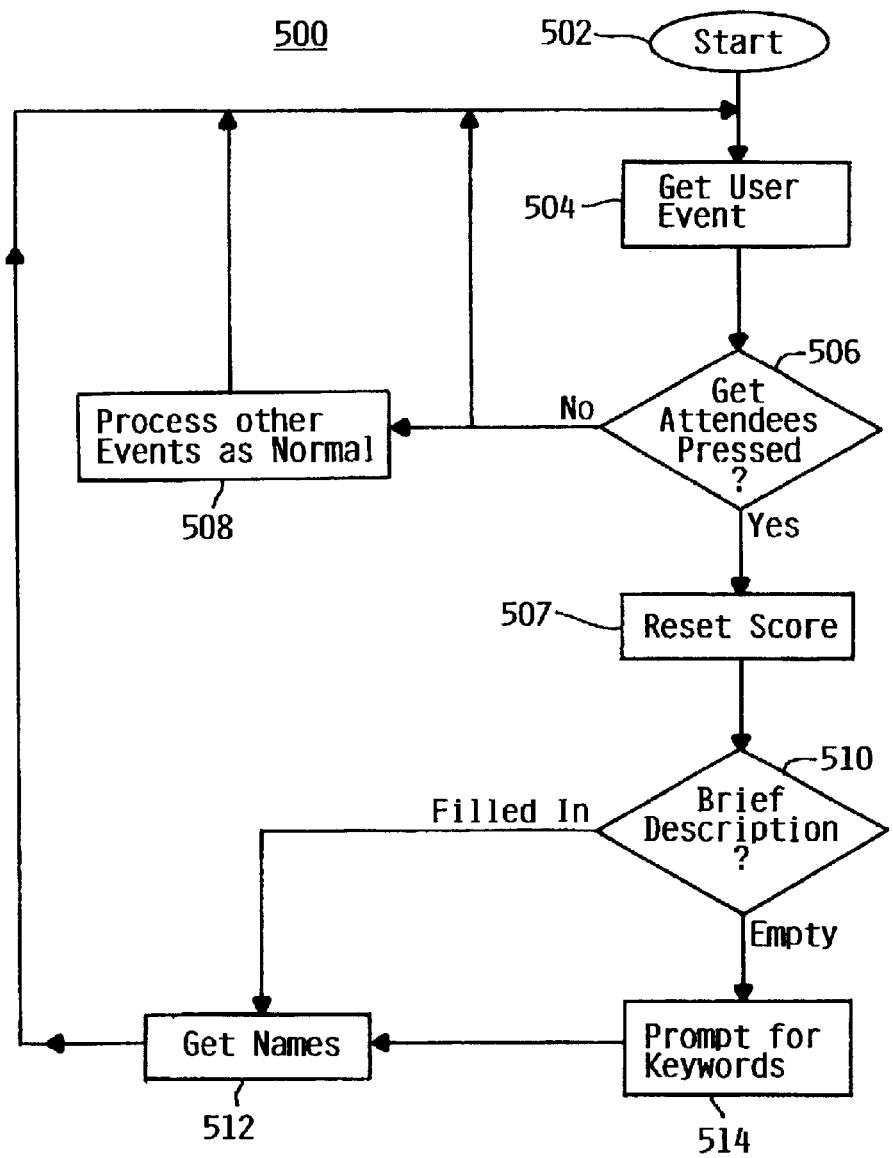
FIG. 5 is a main flow diagram illustrating one aspect of a method of operating the system of the present invention.

Referring now to FIG. 5, there is illustrated a flowchart of a preferred implementation of an improved scheduling method 500 of this invention. At step 502, the method awaits for an event to invoke the group scheduling program 130b. In this regard, for example, the New Calendar tab 320 can be activated, thereby providing the GUI 300 (FIG. 3). It will be appreciated that such activating input can be achieved by a variety of approaches. Other user interface approaches for entering parameters for configuring the improved method of this invention are contemplated.

At step 504, the user or originator may use the meeting schedule module 131a and enter information into appropriate data entry fields on the GUI 300. For example, the user or originator can specify parameters relating to a meeting to be scheduled, as by entering a meeting date in the Date field 340, and a meeting time in the Time field 330. For configuring a search relating to generating the distribution lists, the user or meeting originator can specify search parameters into the Brief Description search field 350. Basically, the search parameters will identify those requirements for searching the subject matter of an electronic message. The search may be accomplished in any suitable searching mode. The specified parameters for the search query can be words, text strings or the like. Illustratively, the search query is a "P4 Radiator design" entered by the user in the Brief Description search field 350. Following this entry, a user activates the Find Attendees button 380 for commencing the steps to be described hereinafter.

Figure 9:
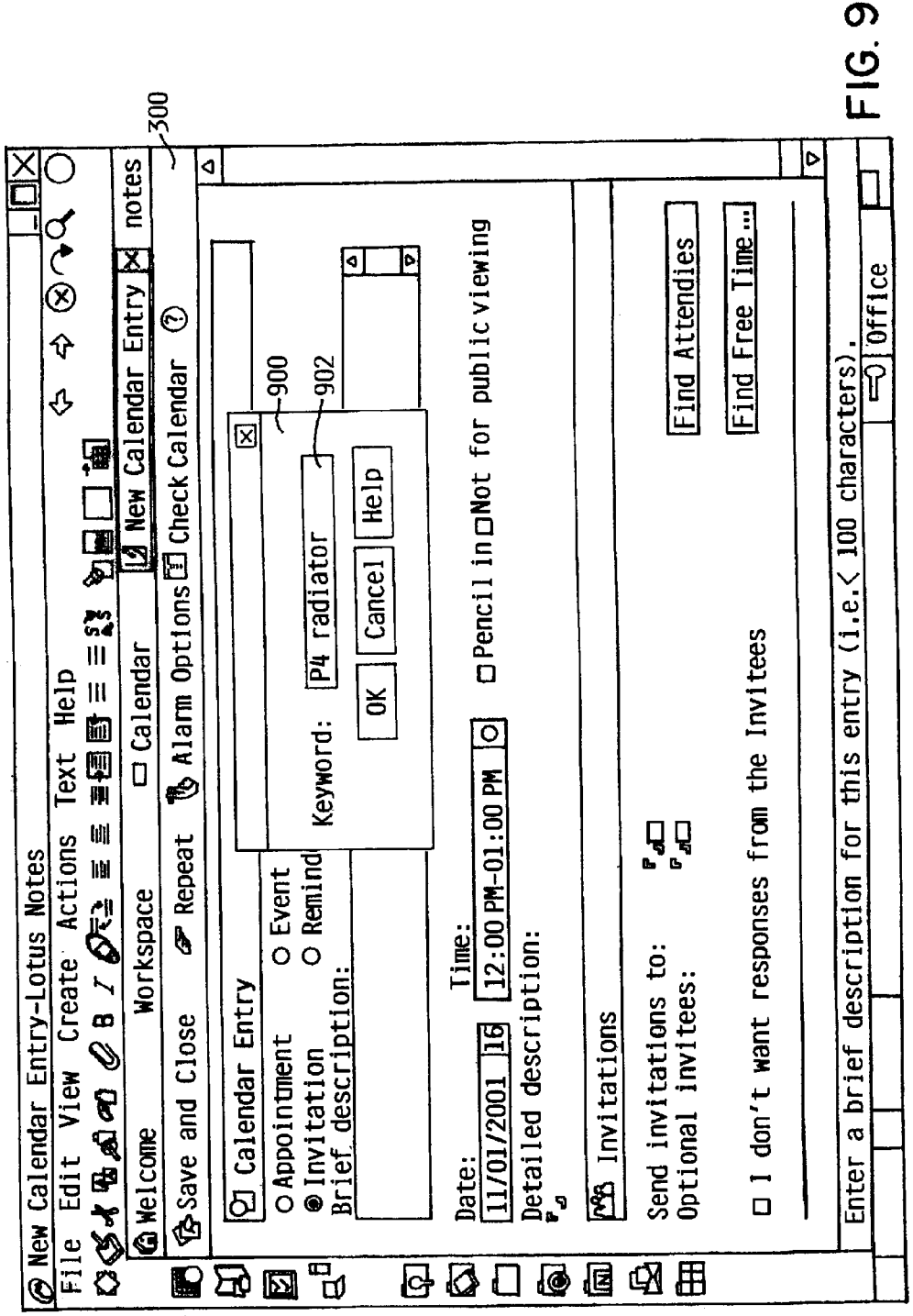
FIG. 9 is a screenshot of a Dialog Box interface for entering user selected search parameters.
Figure 10:
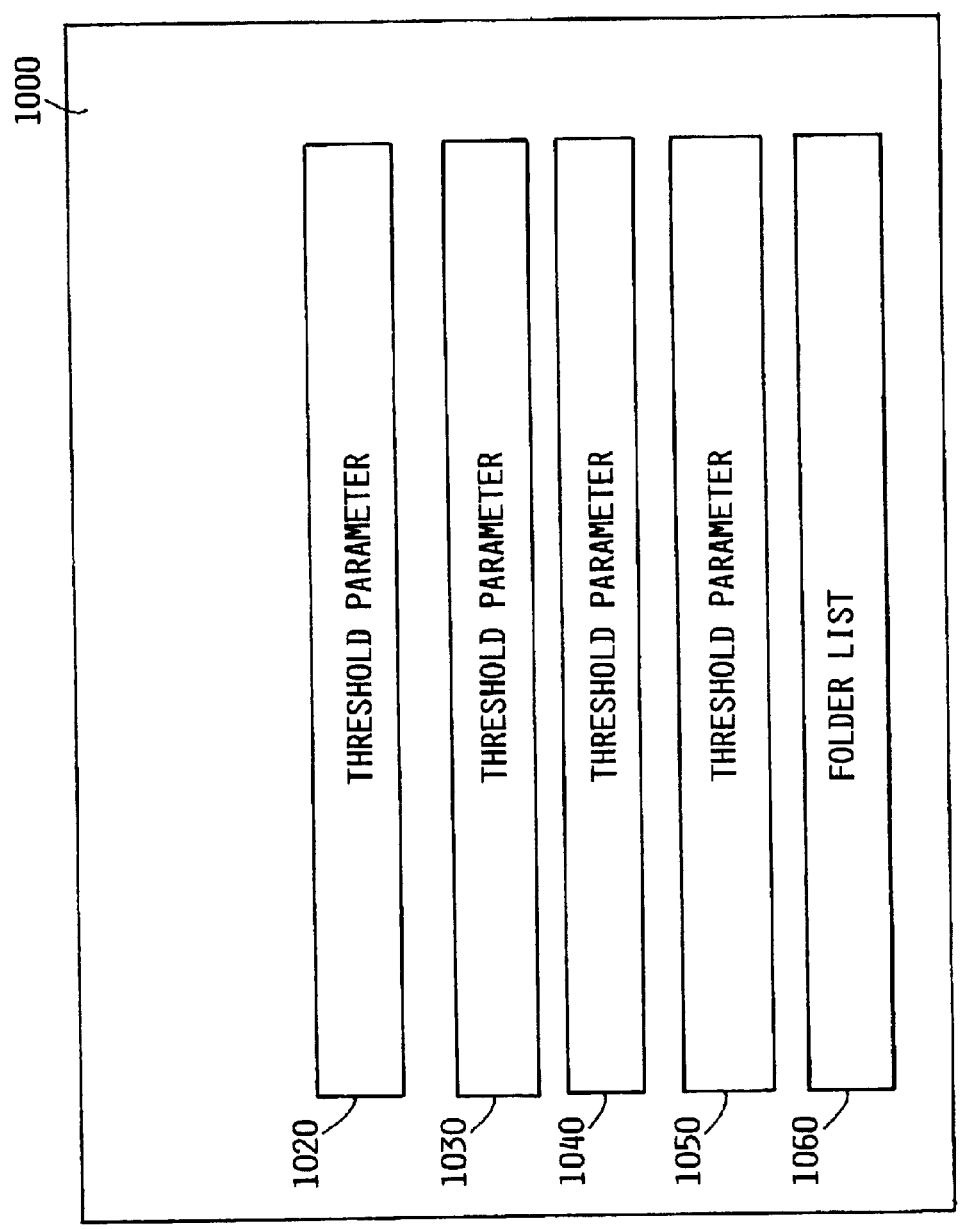
FIG. 10 is a screenshot of a graphical user interface having fields for allowing entry of parameters.
Figure 11:
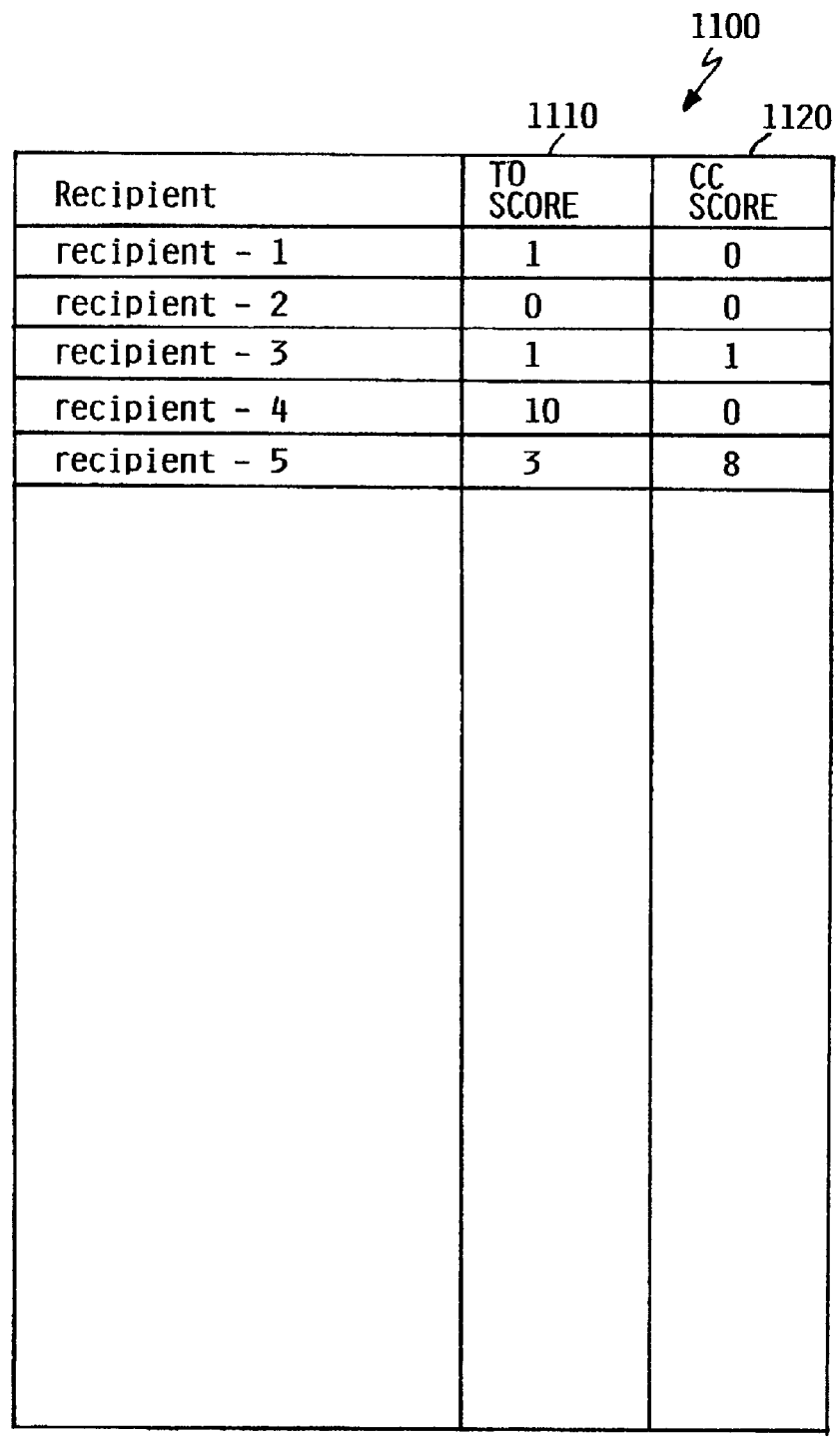
FIG. 11 is an example of a list of recipients of e-mail messages and scores associated with the recipients.

After that, the method continues to step 506, at which a decision is made as to whether or not the Find Attendees button 380 has been activated. If not, the step 508 follows, in which of the Events Handled as Normal activities of the meeting schedule module 131a are commenced. In this latter regard, other scheduling events typically associated with the group scheduler program 130b are handled in a normal manner without any search being conducted whereby the process exits. Otherwise, the process is repeated for the next message. At step 506, if it is decided that the Find Attendees button 380 has been activated, the process proceeds to step 510 after resetting scores, at step 507, associated with or previous recipient's lists as will be noted. At step 510, a decision is made as to whether or not any search terms have been entered to the Brief Description search field 350. If yes, the process proceeds to the Get Names step 512, at which a search of the user's e-mail collection is commenced. The search according to the entered search parameters for providing the most relevant messages. Although the present invention discusses user entered search parameters, it will be appreciated that the invention envisions that the method can be configured in other ways. If it is determined that the search field 350 is empty, then a Search Dialog Box 900 (at step 514), such as shown in FIG. 9, may be presented on a display screen. The Search Dialog Box 900, representative of an agent for prompting the user for search parameters, is provided for including a search box 902 for allowing entry of search parameters related to the subject matter of the messages of interest to the user.

Figure 6A:
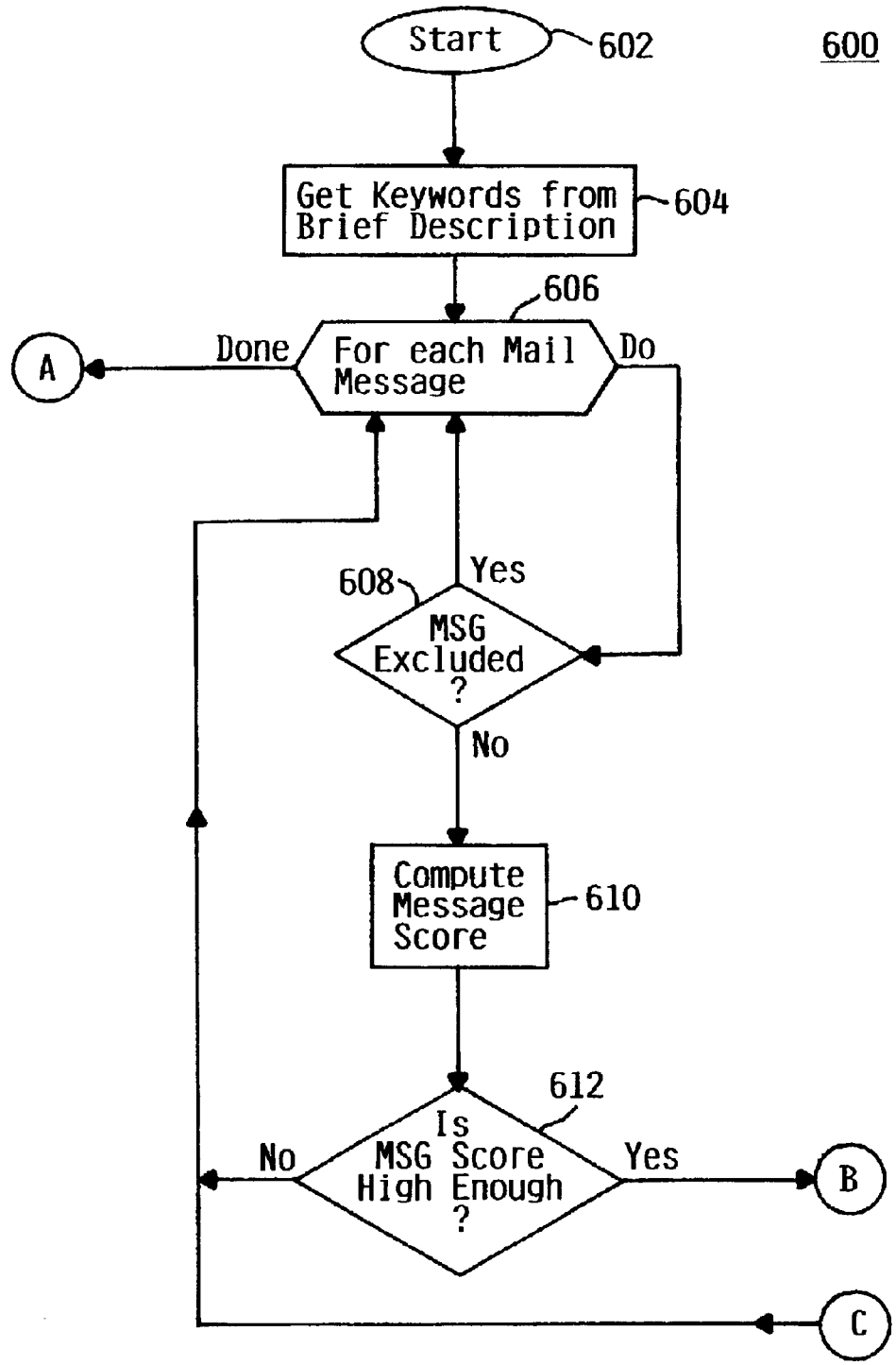
FIG. 6 is a flow diagram illustrating another aspect of a method of operating the system of the present invention.
Figure 6B:
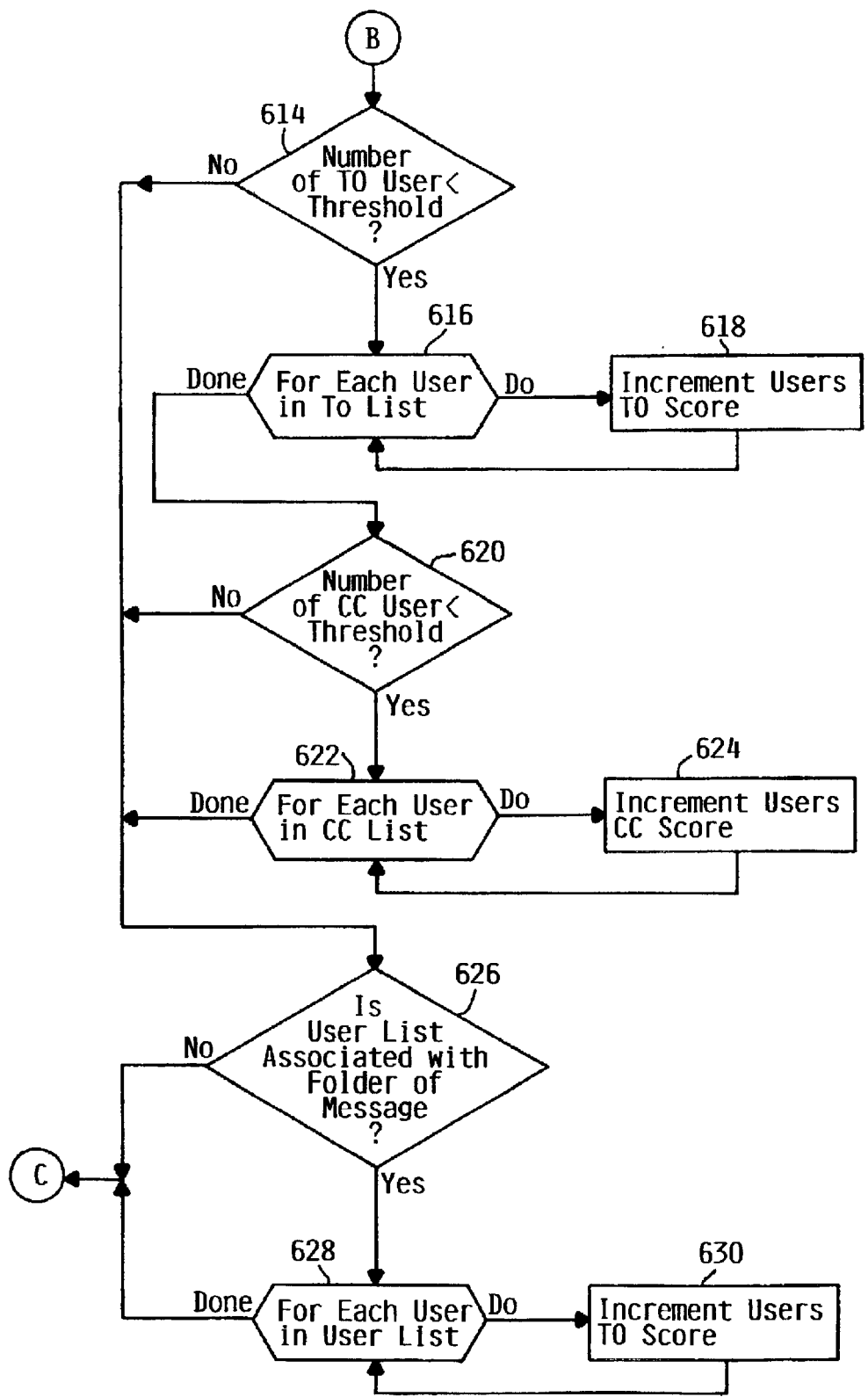

FIG. 6 represents a preferred process or routine 600 of a Get Names module 131c executable for searching and analyzing a collection of the user's e-mail messages, as will be described, for generating distribution lists prepopulated with preselected invitees in a desired order. The desired order can depend on relevance factors of the invitees associated with the subject matter parameter selected e-mail messages. At step 602, events from the steps 510 and 514 are awaited. Upon the occurrence of either one of such events, the process continues to step 604. At step 604, the process 600 obtains the keywords entered in the search fields in either the Brief Description field 390 or search box 902 of the Dialog Box 900. Illustratively, the keywords "P4" and "Radiator" are to be used for generating the distribution lists.

At step 606, the routine 600 is executed by which the e-mail messages are searched by the matching module 131b for use in providing relevancy lists that rank mandatory and optional invitees for scheduling the meetings. At step 608, a determination is made whether or not a message will be excluded from further analysis. A Yes decision is made if it is determined that a flag in a message has been activated. The present invention contemplates providing entry fields in each message for allowing a user to activate, before implementing the process of the present invention. If it is decided that such a message should not be considered for scheduling then the flag would be activated. These flags permit the user to pre-screen message recipients by designating the message for exclusion, such as non-business messages whose recipients (e.g., Aunt Sarah) would probably not be used for scheduling a business meeting. Alternatively, if the message is not excluded then a message score module 132a is provided at step 610 which will be executed in the following manner.

Figure 7:
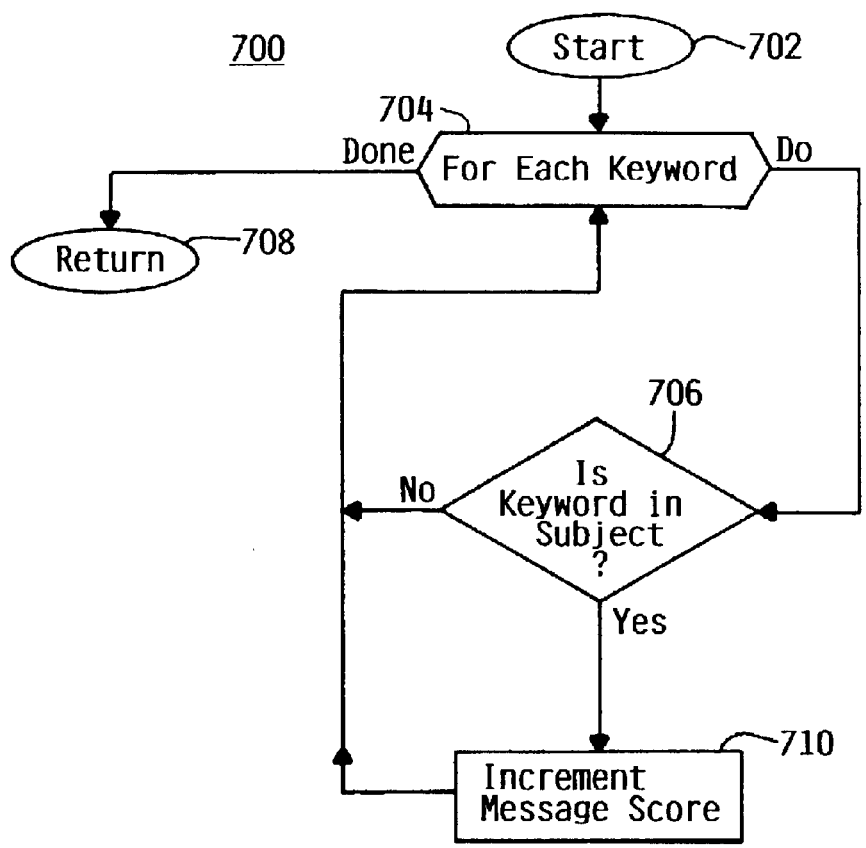
FIG. 7 is a flow diagram illustrating another aspect of a method of operating the system of the present invention.

Reference is now made to FIG. 7 for depicting a compute message score subroutine 700 performed by the message score module 132a to be executed in the Get Names process 600 by the Get Names module 131c. When executed the Compute Message Score subroutine 700 computes a message score for each e-mail message not excluded at step 608 and selected according to the user specified parameters as will be described. The message score is used for purposes of sorting those retrieved messages considered more relevant than others in terms of generating the desired distribution list.

At step 702, the process awaits for each message that was not excluded at step 606. The process continues to step 704 at which each of the keywords that have been identified in step 604 is used in a forward looping process for sequentially searching each of the messages. Illustratively, this process loops twice, first for "Radiator" and second for "P4" or vice versa. A determination is made, at step 706, about whether or not sequential ones of the keywords are present in a particular e-mail message selected at step 606. A variety of searching modes can be executed in doing the searching at step 706. Illustratively, a search is conducted in the subject portion of an e-mail message. Other portions of an e-mail message can be used. If it is determined that there are none of the keywords present, then the subroutine 700 of the compute score module 132a proceeds to a "Return" step 708 after all keywords are tested. Thereafter, the remainder of the Get Names process is resumed. Alternatively, if at step 706, it is determined that a keyword is identified, a message score of, for example "1", can be assigned with a match, such as P4. Each match will adjust or increment a score being assigned to a message. After a match of, for example, the term "Radiator" the message score, at step 710, is incremented to "2". Of course, a variety of suitable relevancy algorithms, such as scoring algorithms provide for scoring the search results. Following assignment of the message scores at step 706, the process continues to the Return step 708; whereupon the next step in the Get Names process continues at step 612.

Reference is made back to FIG. 6. At step 612, a relevancy determination module 132b is made as to whether or not the assigned message score, as noted above, can satisfy a cut-off or threshold parameter in order to have the message continue to be analyzed for defining the distribution list. The cut-off parameters can, preferably, be configured after a user enters a score threshold parameter in data entry field 1020 of the GUI 1000. Illustratively, a message with a score of "1" will not satisfy the user selected cut-off parameter. Other cut-off parameters are contemplated. If at step 612, it is determined that the message score does not exceed the cut-off parameter, the process 600 continues to step 604. Alternatively, such a threshold search parameter can be automatically entered in any known manner. It will be appreciated that the message scoring process clears the score for each process in a suitable manner. Illustratively, if at step 612, the message score for a given message is higher than "1", then the next step 614 in the process follows.

Accordingly, only highly related messages have been selected by the searching performed by the matching module 131b and the remaining portion of the Get Names process 600 will be described for ranking invitees for the distribution lists in accordance with selected parameters as will be described. The invitees or attendees to be selected are, preferably, grouped in categories based on whether or not they are considered mandatory or optional. Essentially, in this embodiment, a first or mandatory list of invitees is related to a first category of e-mail recipients grouped in accordance with whether or not they were present in the mandatory portion (e.g., "To portion") of an e-mail message. A second list of optional invitees is related to a second category of e-mail recipients grouped in accordance with whether or not they were present in the optional portion (e.g., "cc portion") of an e-mail message. Although not shown in the illustrated embodiment, the present invention contemplates providing a list of invitees for the blind courtesy copied ("bcc") portion.

A determination is made at step 614 as to whether or not the number of mandatory or To e-mail recipients of any particular message is less than, preferably, a user selected threshold parameter value. The threshold value serves to sort out those messages considered less relevant than others. In this embodiment, it is assumed that if the number of recipients for any particular message is relatively high (e.g., above the threshold value) such a message would be relatively less worthwhile from the standpoint of relevancy as one having a relatively smaller number of recipients (e.g., at or below the threshold value). However, the present invention is not limited by such assumptions, but rather envisions use of a variety of parameter values for use in setting threshold values. In the illustrated embodiment, the threshold value is selected by the user entering a particular parameter value in the data entry field 1030 of the GUI 1000.

If No is the determination at step 614, then step 626 follows. Alternatively, if the decision at step 614 is Yes, then step 616 follows whereat the process loops for each recipient appearing in the To Portion is identified. Step 618 follows, wherein each of the identified recipients in step 616 is sequentially looked up against a master list 1100 (FIG. 11) including all known message recipients. The master list is to be used for scoring relevancy as will be described. Such a master list of known recipients could be maintained by the mail program, in an address book of the user or in any other suitable fashion. For each match, a score value is assigned or associated to the corresponding recipient's name in the list. For instance, a match in the To portion of a message results in a score being recorded in a To column 1110 that is associated with the matched name on the master list. The score value is adjusted or incremented for each match of the recipient's name as identified in To portions of successive messages. Illustratively, at step 618, each occurrence of a recipient in the To portion of successive messages, leads to a score or value (e.g., "1") being assigned and appropriately incremented in the To column on the master list of message recipients. It will be appreciated that other suitable relevancy algorithms such as scoring algorithms can be utilized. After all the recipients in the To portion have been identified and scored in a ranked or sequential manner, the process proceeds to step 620.

The Get Names process next proceeds to step 620, whereat the cc portion of each message is analyzed. A determination at step 620 is made as to whether or not the number of optional or cc recipients of a particular message previously evaluated at steps 614–618 is less than a user selected threshold parameter value. The threshold parameter value serves to sort out those messages considered less relevant than others. In this embodiment, it is assumed that if the number of recipients for any particular message is relatively high (e.g., above the threshold value) such messages would be relatively less worthwhile from the standpoint of relevancy as one having a relatively smaller number of recipients (e.g., at or below the threshold value). However, the present invention is not limited by such assumptions, but rather envisions use of a variety of parameter values for setting threshold values to eliminate messages having large audiences (e.g., higher than 10). In the illustrated embodiment, the threshold value is selected by the user entering a parameter value in the data entry field 1040 of the GUI 1000.

If a No is the determination at step 620, then step 626 follows. Alternatively, if the decision at step 620 is Yes, then step 622 follows whereat the process loops for each recipient appearing in the cc portion is identified. Step 624 follows, wherein each of the identified recipients in step 622 is sequentially looked up relative to the master list 1100 of known message recipients. The master list is to be used for scoring relevancy as will be described. For each match, a score value is assigned or associated to the corresponding recipient's name in the list. For instance, a match in the cc portion of a message results in a score being recorded in a cc column 1120 that is associated with the matched name on the master list. The score value is adjusted or incremented for each match of the recipient's name as they are identified in cc portions of successive messages. Illustratively, at step 624, each occurrence leads to a score or value (e.g., "1") being assigned and appropriately incremented in a cc column 1120 on the master list. It will be appreciated that other suitable relevancy algorithms such as scoring algorithms can be utilized. After all the recipients in the cc portion have been identified and scored in a sequential manner, the process proceeds to step 626.

At step 626, a determination is made as to whether or not a selected e-mail message is in a folder. At this step it is assumed that a folder is highly related to the subject matter being searched if a matching message appears in a folder (e.g., "inventors"). Accordingly, this invention envisions the advantage of having a user selected special folder distribution list associated with user selected folders. Included in such a special distribution list would be names (e.g., inventors) as being highly related to subject matter of the folder, whether or not the names are e-mail recipients of the selected messages. Such a special distribution list is pre-identified by the user, such as through a user interface entry field 1060 (FIG. 10) prior to the method of the present invention being performed. At step 628, the process loops for each of the recipients of the special folder distribution list relative to the recipients on the master list. Matches will result in a recipient's score being adjusted or incremented at step 630 on the To column 1110 of the master list. A variety of relevancy algorithms can be applied for scoring each recipient. Following step 630, the process continues to step 606.

Figure 8:
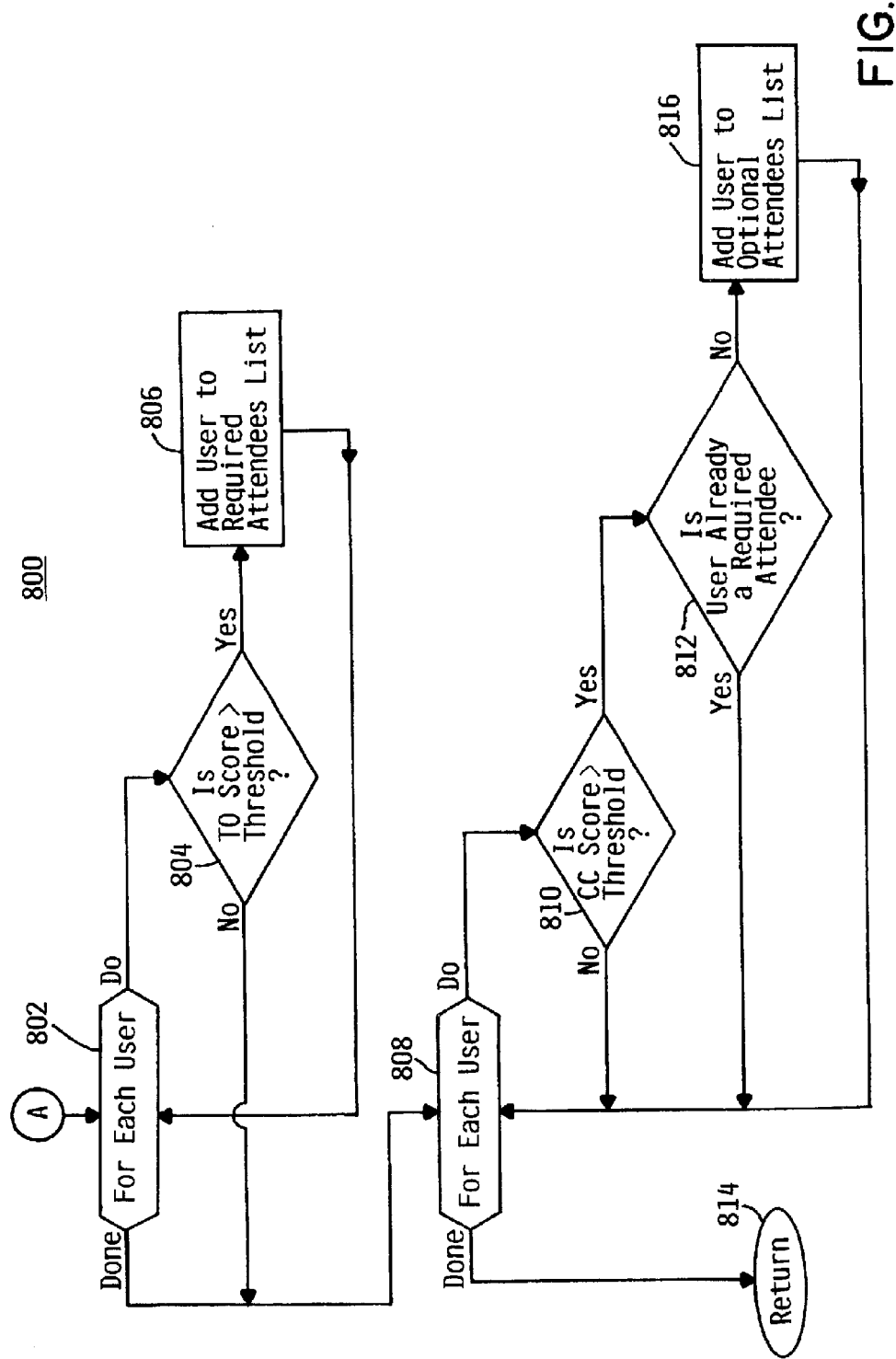
FIG. 8 is a flow diagram illustrating still another aspect of a method of operating the system of the present invention.

Reference is now made to FIG. 8 for illustrating a further process or routine 800 for providing distribution lists of ranked To and cc invitees. Step 802 analyzes each recipient's To score on the master list, whereby at step 804, a determination is made whether or not the recipient's relevance score is at or above a user selected threshold value. If the recipient's relevance score as determined by the relevance determination module is below the threshold value, the recipient is sorted out by the sorting module 132c or eliminated from listing on the To invitee distribution list for scheduling and step 808 follows. Alternatively, if the relevance score of a To recipient is at or above the threshold value, the recipient is sorted by the sorting module 132c so as to be added to the mandatory or required invitee distribution list at step 806. The mandatory or To invitee distribution list can, in known fashion, be displayed by a user interface, such as field 390 (FIG. 4) on the GUI 300. While in the present preferred embodiment discloses listing only those invitees above a preselected threshold, the manner of display can vary in accordance with known display techniques. For instance, the To recipients could be listed, but with the desired sorted recipients being suitably visually highlighted in a manner indicative of their status as invitees. Advantageously, the latter approach allows the user to selectively alter the distribution list in a desired manner before actually scheduling the meeting. Contemplated by the present invention is the concept that the list could also be used as a default list for future generated messages. In terms of the threshold values for sorting as applied at step 804, such can be supplied in numerous ways. For instance, user selected values can be entered in field 1050 of the GUI 1000. The invention envisions that the threshold values can be automatically determined, such as by the maximum capacity of a conference room or the like that will be used as a site for the scheduled meeting. Clearly, a variety of values and reasons are contemplated for creating the cut-offs for sorting the invitees for the distribution lists as well as whether or not these cut-off values are to be entered manually and/or automatically.

The process 800 then continues to step 808. Reference is now made to FIG. 8 for illustrating a further process or routine 800 for providing distribution lists of ranked To and cc invitees. Step 808 provides a mechanism that analyzes or sorts the cc scores of each cc recipient on the master list created above, whereby at step 810, a determination is made as to whether or not the recipient's relevance score is at or above a threshold value. If the relevance score of a recipient is at or above the threshold value, the recipient is added to the optional invitee distribution list at step 816. The optional distribution list can, in known fashion, be displayed by a user interface, such as in field 395 (FIG. 4). Alternatively, If the recipient's relevance score is below the threshold value, the recipient is eliminated or sorted out from listing on the cc invitee distribution list for scheduling and Return step 814 follows; whereby the overall process terminates.

Other display techniques, as noted above, can be used for displaying the mandatory and optional invitees. For instance, the invitees can be displayed in a highlighted fashion and those on the list who could not be accommodated in a resource, for example in a conference room, would be grayed out. As a result, the user can select them individually. Also, a variety of values and reasons are contemplated for creating the ranking on the distribution lists as well as whether or not the values are entered manually or automatically. Following creation of the mandatory and optional lists as noted, the displaying method 800 Returns at step 814 to main process 500 which then terminates.

As described in detail herein, aspects of the preferred embodiment pertain to specific method steps that are implemented on computer systems. In an alternative embodiment, the invention may be implemented as a computer software product for use with a computer system. The programs of the software product define the functions of the preferred embodiment and may be delivered to a computer via a variety of signal-bearing media, which include, but are not limited to, (a) information permanently stored on non-writable storage media (e.g., read-only memory devices within a computer such as CD-ROM disks readable by CD-ROM drive); (b) alterable information stored on writable storage media (e.g., floppy disks within diskette drive or hard-disk drive 114); or © information conveyed to a computer by a communications medium, such as through a computer or telephone network, including wireless communications. Such signal-bearing media, when carrying computer-readable instructions that direct the functions of the present invention, represent alternative embodiments of the present invention. Alternate embodiments may include implementation of the inventive software program as an application program stored on the computer, as program code stored in a device driver or on an output device itself, or on a network device such as a server or firewall.

The embodiments and examples set forth herein were presented to best explain the present invention and its practical application and to thereby enable those skilled in the art to make and use the invention. However, those skilled in the art will recognize that the foregoing description and examples have been presented for the purposes of illustration and example only. The description set forth is not intended to be exhaustive or to limit the invention to the precise forms disclosed. Many modifications and variations are possible in light of the above teachings without departing from the spirit and scope of the appended claims.

What is claimed is:

1. A method of automatically generating at least a distribution list for use in a scheduling system, comprising the steps of:

provisioning a collection of electronic messages wherein each one of the messages includes at least a recipient portion containing recipients and a subject portion containing subject matter;

providing at least one search parameter for use in searching the subject matter T of each one of the messages;

matching messages by having the one search parameter match with subject matter having an attribute of the one search parameter;

providing a relevancy ordering of recipients of the recipient portion associated with the matched messages; and, sorting the relevancy ordering of recipients to provide the distribution list.

2. The method of claim 1 wherein the relevancy ordering is in accordance with an algorithm.

3. The method of claim 2 wherein the relevancy algorithm operates to provide a score indicative of relevance.

4. The method of claim 1 wherein the step of providing the distribution list includes providing a first list associated with a first category of recipients.

5. The method of claim 4 wherein the first list includes meeting invitees considered mandatory for a meeting.

6. The method of claim 4 wherein the step of providing the distribution list includes providing a second list associated with a second category of recipients.

7. The method of claim 6 wherein the second category of recipients includes meeting invitees considered optional for a meeting.

8. The method of claim 1 wherein the step of matching messages includes excluding messages not satisfying at least one user selected parameter.

9. The method of claim 1 wherein the step of providing a relevancy ordering of recipients includes eliminating matched messages having a number of recipients above a selected parameter.

10. The method of claim 1 wherein the step of providing a relevancy ordering includes evaluating a special distribution list of recipients associated with a folder containing a matched message.

11. The method of claim 1 further including sorting the distribution list automatically by limiting the invitees in accordance with limitations imposed by a meeting resource.

12. A computer system using a scheduling mechanism for automatically generating a distribution list of ordered invitees for scheduling a meeting, said system comprising:

a memory containing a collection of electronic messages wherein each of the messages has at least a portion for subject matter and at least a portion for message recipients; and a group scheduling application including a module for scheduling a meeting;

the group scheduling application including a matching module configurable to match messages having subject matter with an attribute of at least one user selected search parameter;

the group scheduling application includes a relevance determination module for providing an ordered relationship to a list of recipients of the matched messages; and a sorting module for sorting the ordered relationship to provide the distribution list; and a processor which performs operations comprising: matching each message in the collection having an attribute to at least one user selected search parameter;

providing a relevancy ordering of the recipients of the matched messages by the relevance determination module; and sorting the relevancy ordering by the sorting module for providing the distribution list of ordered invitees.

13. The scheduling system of claim 12 wherein the relevance determination module includes an algorithm for assigning a score to each recipient of the matched messages, whereby a score is indicative of the relevancy of the recipients of the matched messages.

14. The scheduling system of claim 12 wherein the matching module provides for excluding messages in the collection of messages which do not satisfy a user selected parameter.

15. The scheduling system of claim 12 wherein the relevance determination module provides a first category of ordered recipients.

16. The scheduling system of claim 15 wherein the relevance determination module provides a second category of ordered recipients.

17. The scheduling system of claim 15 wherein the first category of ordered recipients is related to a first list of invitees of the distribution list.

18. The scheduling system of claim 16 wherein the second list of ordered recipients is related to a second list of invitees.

19. The scheduling system of claim 12 wherein the relevance determination module evaluates at least a special distribution list associated with a folder in which a matched message is located.

20. The scheduling system of claim 12 wherein the sorting module sorts the invitees in accordance with limitations imposed by a meeting resource.

21. A computer program product for use in a computer-implemented process for automatically generating a distribution list for use in a scheduling system by analyzing a collection of electronic messages wherein each one of the messages includes at least a recipient portion containing recipients and a subject portion containing subject matter, the computer program product comprising:

a medium readable by a computer, the computer readable medium having computer program code adapted for:

providing at least one search parameter to be used for searching the subject matter of each one of the messages for attributes of the search parameter;

matching messages by having the one search parameter match with subject matter having an attribute of the one search parameter;

ordering the recipients associated with the matched messages by relevancy; and, sorting the relevancy ordered recipients to provide the distribution list of invitees.

22. The computer program product of claim 21 wherein the relevancy step is performed by an algorithm for assigning a score to each recipient which score is indicative of relevancy.

23. The computer program product of claim 21 further including a step of excluding matched messages that do not meet at least an exclusion parameter.

24. The computer program product of claim 21 wherein the relevancy ordering includes eliminating matched messages in accordance with a parameter.

25. The computer program product of claim 21 wherein the relevancy determining includes evaluating a special distribution list associated with a folder in which a matched message is located.

26. The computer program product of claim 21 wherein sorting includes automatically limiting invitees in accordance with limitations imposed by a meeting resource.

27. The computer program product of claim 21 wherein providing the distribution list includes providing a first list of invitees associated with a first category of recipients.

28. The computer program product of claim 27 wherein the step of providing the distribution list includes providing a second list of invitees associated with a second category of recipients.

* * * * *

Disclaimer

6,816,863 B2 — Cary Lee Bates, Rochester, MN (US); John Matthew Santosuosso, Rochester, MN (US). METHOD, SYSTEM, AND COMPUTER PRODUCT FOR PROVIDING A DISTRIBUTION LIST, Patent dated Nov. 9, 2004. Disclaimer filed Oct. 05, 2006 by Assignee International Business Machines Corporation.

Hereby enter this disclaimer to all claims of said patent.

*(Official Gazette, April 22, 2008)*